D. P. PERRY.
PROCESS OF PREPARING ALKALINE ELECTROLYTES FOR STORAGE BATTERIES.
APPLICATION FILED DEC. 26, 1903. RENEWED MAR. 18, 1908.
931,082.
Patented Aug. 17, 1909.
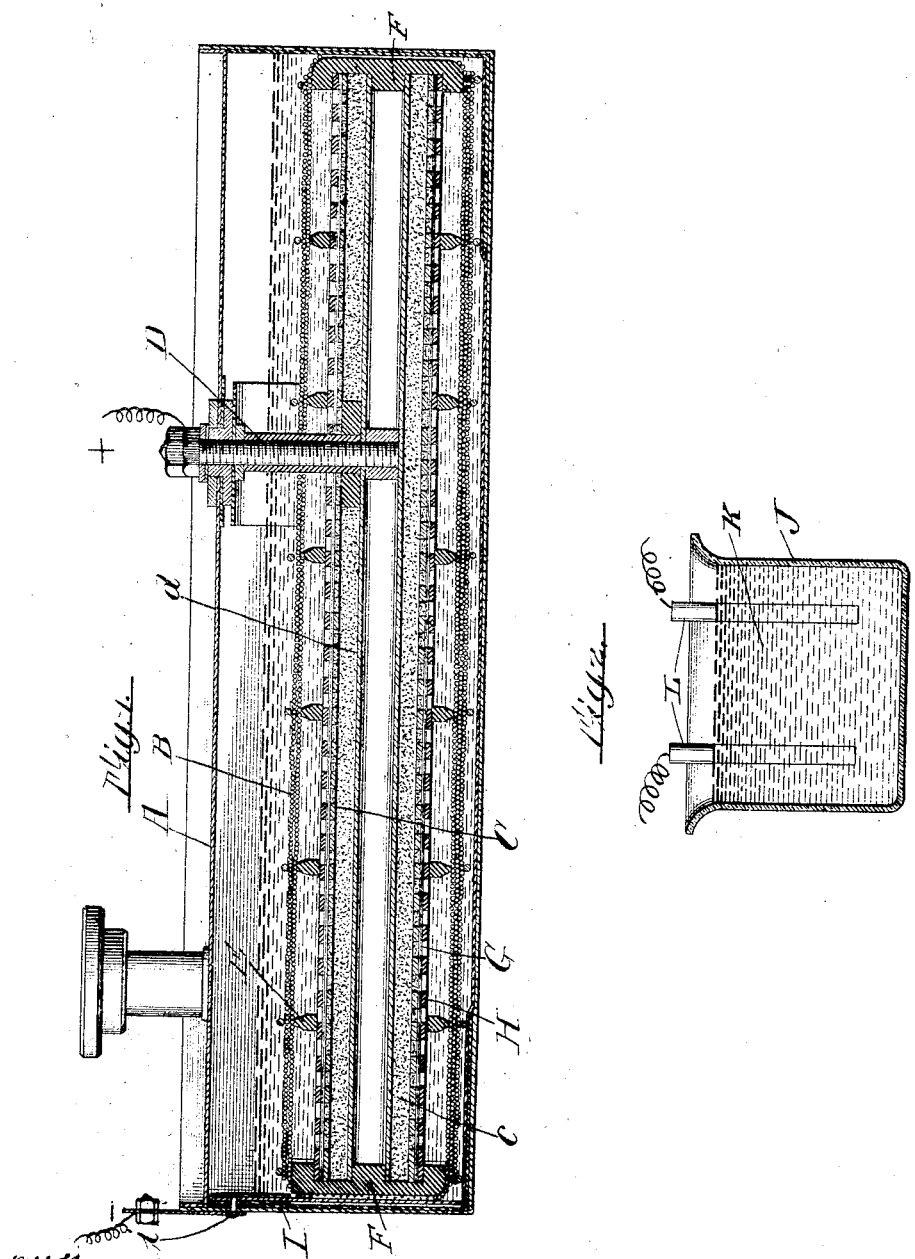

UNITED STATES PATENT OFFICE.

DAVID P. PERRY, OF CHICAGO, ILLINOIS, ASSIGNOR, BY MESNE ASSIGNMENTS, OF TWO-THIRDS TO WILLIAM MORRISON, OF CHICAGO, ILLINOIS, AND ONE-THIRD TO M. A. LUMBARD, OF DES MOINES, IOWA.

PROCESS OF PREPARING ALKALINE ELECTROLYTES FOR STORAGE BATTERIES.

No. 931,082.  Specification of Letters Patent.  Patented Aug. 17, 1909.

Application filed December 26, 1903, Serial No. 186,753. Renewed March 13, 1908. Serial No. 421,912.

*To all whom it may concern:*

Be it known that I, DAVID P. PERRY, a citizen of the United States of America, and resident of Chicago, Cook county, Illinois, have invented a certain new and useful Improvement in Processes of Preparing Alkaline Electrolytes for Storage Batteries, of which the following is a specification.

My invention relates to the preparation of alkaline electrolytes for storage batteries, as for example zincate of potash, and other similar solutions.

Generally stated, the object of my invention is the provision of an improved process or method whereby electrolytes of this character may be furnished to storage batteries in such condition as to be free, or practically free from any impurities which might tend to interfere with the proper working of the battery in which it is employed.

A special object is to provide an improved process or method whereby an electrolyte which is, as stated, free, or practically free, from impurities may be produced in a simple, practical and highly economical manner.

The nature and advantages of my invention will, however, hereinafter more fully appear.

In the accompanying drawings Figure 1 is a longitudinal section through a storage battery in which the alkaline solution produced by my improved process may be employed. Fig. 2 is a diagrammatic view illustrating one method of obtaining a pure, or practically pure, alkaline or potash solution.

It will be readily understood that the electrolyte obtained by my improved process can be employed in any suitable, known or approved form of alkaline battery. For example, and as shown in Fig. 1 of the drawings, the battery may consist of a suitable cell A, a positive element B, and an inner or negative element C, the outer element being of copper wire gauze, the inner element consisting of a perforated copper tube filled with any suitable known or approved active material c. The positive pole of the battery D can be suitably connected with the negative element through the medium of the centrally arranged metallic conductor d. As illustrated, the cylindric positive and negative elements B and C are maintained in their proper relative positions by means of rubber rings E, and rubber caps or end pieces F. In this form of battery, the inner negative element is preferably covered with one or more layers of porous material G, such as paper and linen, and by an outer perforated copper tube H. The metallic cell constitutes the negative pole of the battery, and is connected with the positive element through the medium of the metal strip I and rivet i. In a battery of this character, the electrolyte may consist of a solution of zincate of potash, of the ordinary character, the action and workings of an alkaline storage battery of this nature being well known. In order, however, that the working of a battery of this character may be materially improved, and in order that its serviceability may be substantially increased, I employ an improved process for making the electrolyte, the object being to insure the provision of an electrolyte, such as zincate of potash, for example, which will be free, or practically free, from impurities.

In carrying out my improved process or method of producing alkaline zincate, for use as an electrolyte for any suitably constructed storage battery, I first place within a battery, say of the construction shown in Fig. 1, a sufficient quantity of the ordinary alkaline solution—that is to say, zincate of potash which is ordinarily employed for this purpose. I then charge the battery, in the usual manner, by connecting it with a suitable source of current, and this of course deposits the zinc of the solution upon the positive element of the battery. In order to purify the zinc, this operation can be repeated several times, the alternate charging and discharging of the battery tending to relieve the zinc of its impurities. With the zinc thus deposited upon the positive element, I then pour off the solution and wash out the battery, a very thorough washing being necessary to leave the interior of the battery perfectly clean and free from all sediment or impurities. After this, I then place within the battery a pure, or practically purified, alkaline solution, as for example, a suitable solution of potash and, of course, without the zinc. The battery can now be discharged in the usual manner, and the zinc on the positive element will enter the solution, forming zincate of potash. In this way, a pure electrolyte is insured, the zinc, in a practically pure condition, being caused to enter the solution without any danger of oxidizing, and in a very simple, practical and economical manner. With the electrolyte prepared in this manner, the battery can be repeatedly charged and discharged and used continuously, in the ordinary manner, without causing any sediment or impurities to accumulate at the bottom of the battery. And this, of course, is due to the fact that the electrolyte, before being put into practical use, has been relieved of all impurities.

The alkaline or potash solution can be purified in any suitable known or approved manner. For example, this alkaline of potash solution, which is of course, as stated, devoid of zinc, and which is placed within the battery after the zinc of the ordinary zincate of potash solution has been deposited on the positive element, can be rendered pure by subjecting it to electrolysis.

As shown in Fig. 2, the alkaline or potash solution K may be placed within a suitable receptacle J, containing two suitable electrodes L—L, and subjected to current, and the solution thus electrolyzed and purified by electrolysis, the impurities being precipitated to the bottom of the receptacle. The pure liquid or potash solution can then be poured off, and when thus obtained is adapted for use in the manner explained—that is to say, it is ready to be placed in the battery containing the zinc-plated positive element. Thus it will be seen that I provide an improved process for producing a pure, or practically pure, alkaline electrolyte for storage batteries; that the said process is of a very simple, practical and economical character, and is of an extremely satisfactory nature from a manufacturing standpoint; that it is a process which involves as a step or steps the ordinary charging and discharging of the battery; that as a result the electrolyte thus cheaply and effectively produced is capable of rendering any alkaline storage battery in which it is employed much more satisfactory in use.

What I claim as my invention is:

1. The process of preparing an alkaline zincate electrolyte for storage batteries, which consists in first placing an alkaline zincate within a suitable storage battery, then charging the battery and thereby depositing the zinc of the solution upon the positive element of the battery, then pouring off the solution and washing out the battery, and replacing the solution thus poured off with a purified alkaline solution, and then discharging the battery.

2. The process of preparing an alkaline zincate electrolyte for storage batteries, which consists in first placing an alkaline metallic solution in a suitable battery, charging the battery in the ordinary manner and thereby depositing the metal held in solution upon the positive element of the battery, then pouring off the solution and washing out the battery, and finally replacing the solution thus poured off with a purified alkaline solution and then discharging the battery.

3. The process of preparing an alkaline zincate electrolyte for storage batteries, which consists in placing an alkaline zincate electrolyte in a storage battery, charging the battery, pouring off the solution and washing out the battery, and then replacing the solution thus poured off with an electrolytically purified alkaline solution and then discharging the battery.

Signed by me at Chicago, Cook county, Illinois, this 25th day of November, 1903.

DAVID P. PERRY.

Witnesses:
S. B. CHABOWSKI,
WM. A. HARDERS.